United States Patent Office 3,009,057
Patented Nov. 14, 1961

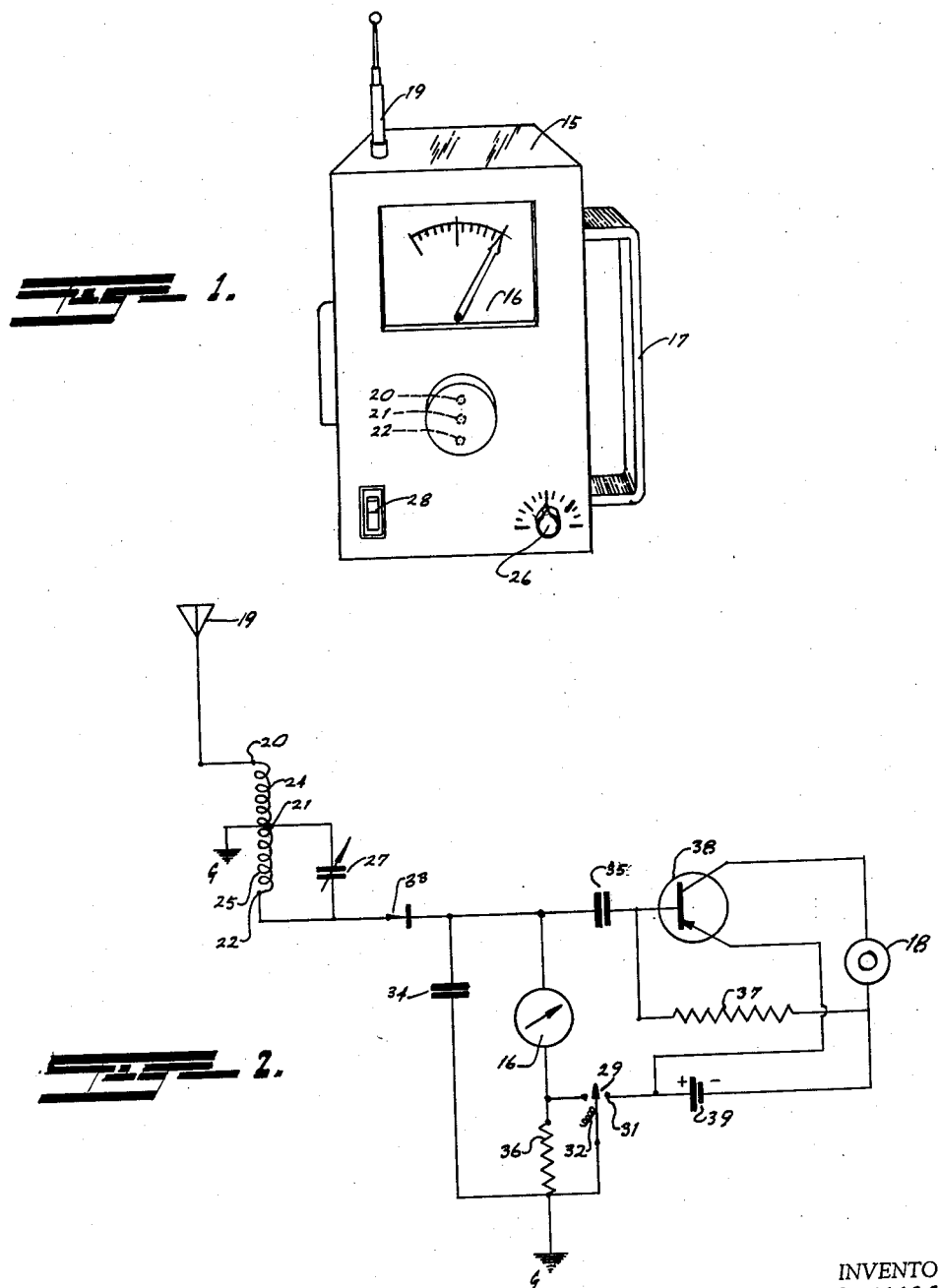

3,009,057
INDICATING DEVICE FOR ALIGNMENT OF RADIO TRANSMITTERS
Marcus Glaser, Laurelton, N.Y., assignor to Shell Electronics Mfg. Corp., New York, N.Y., a corporation of New York
Filed June 19, 1958, Ser. No. 743,081
6 Claims. (Cl. 250—1)

The present invention relates to a novel and improved indicating device to facilitate proper tuning of a radio transmitter.

An object of this invention is to provide a novel and improved indicating device of the character mentioned, to show the field strength of an operating radio transmitter and affording preception of tone quality and percentage of modulation.

A further object thereof is to provide a novel and improved indicating device of the kind set forth, which by an easy interchange of tuner components, is applicable for testing the performance and as an aid for the proper tuning and alignment of radio transmitters operating at different frequencies respectively.

Still a further object thereof is to provide a novel and improved construction for such indicating device so that it is compact and portable, simple in structure, reasonable in cost and efficient in carrying out the purposes for which it is designed.

Other objects and advantages will become apparent as this disclosure proceeds.

In the accompanying drawing forming part of this specification, similar characters of reference indicate corresponding parts in all the views.

FIG. 1 is a perspective view showing an indicating device embodying the teachings of this invention.

FIG. 2 is a wiring diagram of the electrical circuit connections and the various components of apparatus therein involved.

In the drawing showing a preferred embodiment of this invention, the numeral 15 designates a portable case which may be no larger than about 4" x 6" x 2". A meter 16 for measuring the field strength of a radio transmitter, is visible through a window in the front wall of the case. One side wall is equipped with a handle to carry the case, as indicated by the numeral 17. An ear phone 18 is mounted through the other side wall, to be brought to the ear to perceive tone quality and when the field strength showing is proper, to judge the percentage of modulation. A telescopic antenna 19 is extensible from the top wall of the case and retractable into the case when not in use. The front wall of the case 15, presents a three-socket receptacle to receive the contact pins 20, 21, 22 of a male plug 23 which is a plug-in coil. It is evident that such plug is removable. This plug contains a tuner means to have resonance with the frequency of the transmitter to be tested and tuned. With the said testing device, there is a supply of such plugs, each suitably related respectively for transmitters operating at different frequencies. Such tuner means comprises the coils 24, 25. The numeral 26 at the front of the case, denotes the control knob for adjusting the variable condenser 27 which is interior the case. Accessible at the exterior of the case 15, is the operating member 28 of a single pole, double throw switch, whose contacts which cooperate with its pole 29, are designated respectively by the numerals 30 and 31. Said pole 29 is normally in contact with contact 30; being biased for such by the spring 32.

Also housed within the case 15, are the following: a detector 33 which is a crystal diode, the capacitances 34 and 35, the resistances 36, 37, the amplifier which is the transistor 38 and the dry cell 39.

Referring to the circuit diagram, the electrical connections are as follows: One of the terminals of the meter 16, the capacitances 34, 35 and of the detector 33, are connected together. The other terminal of the detector 33 is connected to one terminal of the capacitance 27 and to one terminal of the coil 25. The other terminals of the capacitance 27 and the coil 25, and one of the terminals of the coil 24, are connected to ground. The other terminal of coil 24 is connected to the antenna 19. The other terminal of the meter 16, one terminal of the resistance 36 and the contact member 30 of the switch, are connected together. The pole 29 of the switch, the other terminal of the resistance 36 and the other terminal of the capacitance 34, are all connected to ground. The other terminal of the capacitance 35, one terminal of the resistance 37 and the terminal of the mineral of the transistor 38, are connected together. One pin contact terminal of the transistor 38, the contact member 31 of the switch and the positive pole of the cell 39, are connected together. The other pin contact terminal of the transistor 38 is connected to one terminal of the ear phone 18. The other terminals of the ear phone 18 and of the resistance 37, are connected to the negative pole of the cell 39. The term "connected" shall be deemed to mean electrically connected.

It is evident that normally, the meter 16 is in operative condition in the circuit and that the transistor 38 and the ear phone 18 are disconnected and therefore inoperative. In this normal condition, the apparatus is used to measure the transmitter field strength and the transmitter is adjusted until the meter reading is proper. Then, upon shifting the operating member 28 of the switch thereby stressing the spring 32, the pole 29 will contact 26, whereupon the transistor 38 and the ear phone 18 will be brought into circuit and receive the transmitter's signal, whose tone quality is ascertained by listening to the ear phone. If the degree of audibility is proper, the transmitter is aligned, if improper, adjustment is made in the transmitter to change modulation until the signal heard is proper. When the switch is in said shifted position, the resistance 36 acts as the diode load, the capacitance 34 serves to remove the R.F., and the capacitance serves as the blocking coupling condenser. The meter 16 is then inactive because of the high resistance value of 36.

In practice, the capacity of capacitance 34 is 0.002 microfarad and that of 35 is 0.05 microfarad. The resistance 36 is 100K ohms and the resistance 37 is 470K ohms; the value of K being 1000. The function of the resistance 37 is to attain bias.

Before testing any particular transmitter to get it aligned, a proper plug 23 is mounted for connection to the terminals 20, 21, 22 so that the radio signal receiving apparatus herein described is in resonance with the normal operating frequency of such transmitter being tested and adjusted for alignment.

The case 15, when of metal, may serve as the ground connections, and of course, all its contents are suitably insulated therefrom.

This invention is capable of numerous forms and various applications without departing from the essential features herein disclosed. It is therefore intended and desired that the embodiment shown herein shall be deemed illustrative and not restrictive and that the patent shall cover all patentable novelty herein set forth; reference being had to the following claims rather than to the specific description herein to indicate the scope of this invention.

I claim:
1. In an indicating device for aligning a radio transmitter, a meter for showing the field strength of a radio transmitter, a compact antenna, a first tuner coil, a sec- ond tuner coil, a variable condenser, a crystal diode detector, first and second capacitances, first and second comparatively high resistances, a single-pole double-throw switch means comprising a movable pole member and first and second contact members and spring means biasing said pole member so that it is normally in contact with the first contact member, a transistor, a cell for supplying direct current electrical energy, first, second and third contact elements and an ear phone; one terminal of the meter, and of both capacitances and of the detector, being electrically connected together; one terminal of the variable condenser, and the first contact element, being electrically connected to the other terminal of the detector; the other terminal of the variable condenser, the second contact element, being both electrically connected to ground; the third contact element being electrically connected to the antenna; the other terminal of the meter, the first contact member of the switch and one terminal of the first resistance, being electrically connected together; the pole member of the switch, the other terminal of the first resistance and the other terminal of the first capacitance being all electrically connected to ground; one terminal of the second resistance, the other terminal of the second capacitance and the terminal of the mineral of the transistor, being electrically connected together; the terminal of one pin contact of the transistor, the second contact member of the switch and the positive pole of the cell, being electrically connected together; the terminal of the other pin contact of the transistor being electrically connected to one terminal of the ear phone; the other terminal of the ear phone and the other terminal of the second resistance being electrically connected to the negative pole of the cell; the tuner coils being associated to form a separate unitary structure presenting three contact pieces in releasable engagement respectively with the three contact elements and a frame having substantially all of the remaining parts of the device mounted thereon, thereby forming a second unitary structure; the contact piece which is associated with the second contact element on the frame, being electrically connected to one terminal of each of the tuner coils and the other contact pieces being electrically connected respectively to the other ends of said coils.

2. An indicating device as defined in claim 1, wherein the ear phone is carried on the frame.

3. An indicating device as defined in claim 1, wherein the unitary structure which includes the tuner coils is in the form of a plug.

4. An indicating device as defined in claim 1, wherein the frame is a portable case.

5. An indicating device as defined in claim 4, wherein the ear phone is carried by the case and extends through a wall thereof.

6. An indicating device as defined in claim 4, wherein the antenna is of the telescoping type and arranged to be extended out of the case and retracted to a position where substantially all of the antenna is within the case.

References Cited in the file of this patent

UNITED STATES PATENTS

| | | |
|---|---|---|
| 1,990,489 | Hopkins | Feb. 12, 1935 |
| 2,109,189 | Bly | Feb. 22, 1938 |
| 2,545,544 | Doherty | Mar. 20, 1951 |
| 2,732,491 | Jeannot | Jan. 24, 1956 |

FOREIGN PATENTS

| | | |
|---|---|---|
| 830,392 | France | May 16, 1938 |

OTHER REFERENCES

Article: "Transistorized TV Antenna Compass and Field Strength Meter," Radio and Television News, January 1956, pp. 43–45.